United States Patent [19]

Katsuyama et al.

[11] Patent Number: 4,622,591
[45] Date of Patent: Nov. 11, 1986

[54] APPARATUS AND METHOD FOR PRECISELY ORIENTING ORIGINALS ON AN IMAGE SCANNER DRUM

[75] Inventors: Mikizo Katsuyama; Teruo Fujii; Hirohisa Tanaka, all of Kyoto, Japan

[73] Assignee: Dainippon Screen Mfg. Co., Ltd., Kyoto, Japan

[21] Appl. No.: 801,695

[22] Filed: Nov. 25, 1985

[30] Foreign Application Priority Data

Dec. 6, 1984 [JP] Japan .................. 59-258742

[51] Int. Cl.$^4$ ............................................ H04N 1/00
[52] U.S. Cl. ..................... 358/256; 358/289; 358/290
[58] Field of Search ............... 358/256, 292, 289, 290

[56] References Cited

U.S. PATENT DOCUMENTS 2,394,649  2/1946  Young ........................... 358/294
2,921,977  1/1960  McConnell ..................... 358/290
3,938,191  2/1976  Jarmy ............................ 358/289
3,975,590  8/1976  Nelson ........................... 358/289

Primary Examiner—James J. Grody
Assistant Examiner—Edward L. Coles
Attorney, Agent, or Firm—Lowe Price LeBlanc Becker & Shur

[57] ABSTRACT

A pattern shaped and sized to fit adjacent the inner cylindrical surface of a transparent scanner drum, of a drum-type image scanning system is oriented to display at least one line parallel to the axis of rotation of the drum. The pattern preferably has other lines oriented to other predetermined directions. The pattern is held in place inside the drum by a coaxial lighted cylindrical pattern holder rotatable with the drum. The user aligns the original with reference to the lighted pattern for affixation as desired on the drum surface for scanning of the original image therefrom.

10 Claims, 2 Drawing Figures

APPARATUS AND METHOD FOR PRECISELY ORIENTING ORIGINALS ON AN IMAGE SCANNER DRUM

BACKGROUND OF THE INVENTION

1. Field of the Invention

This invention relates to apparatus and methods for precisely locating originals affixed onto an original-holding cylindrical drum of an input scanning unit of a drum type image scanning apparatus such as a color scanner for use in graphic arts and, more particularly, to a device by which an operator can position the originals exactly and easily on the drum either parallel with the axis of the drum or oriented at a specified angle thereto.

2. Description of the Prior Art

In a conventional drum type image scanning apparatus, a transparent cylindrical drum in the input scanning unit serves as a base onto which is wrapped the "original" to be scanned. The original is fastened on with an adhesive tape and the drum is rotated at a controlled speed so that the fastened original is optically scanned by means of a photoelectric scanning head which is transversely fed (crossfed) while facing the drum. The original is attached to the drum either while the drum is in the image scanning apparatus or while it is detached therefrom. In this operation, a line serving as a reference is not provided on the original cylinder, because if such a reference line were on the original cylinder itself, a shadow produced thereby would negatively affect the scanning process. Accordingly, in the process of attaching the original to the drum, the original is usually oriented either in parallel with the axis of the original cylinder, or at a specified angle therewith, based solely on the perception and judgment of the operator.

The applicant has already proposed one solution, disclosed in Japanese patent application No. 58-72679, wherein, by using a projector for projecting a focused image while continuously changing the projection magnification, an image of the original is projected on a block copy layout sheet to coincide a contour of the projected image with that of an image drawn on the layout sheet. This allows simultaneous realization of the reproducing magnification of the original and a predetermined angle between the projected image of the original and the image of the block copy. Keeping its particular orientation, each original is individually affixed to a transparent sheet so that, for each transparent sheet, an original is affixed onto the scanner drum.

However, there is still present the disadvantage of increased cost, since such an original patching device is in effect a highly accurate enlarger and it is necessary to have a transparent sheet for each original. Even with such expensive devices using transparent sheets, the patching operation must still be based largely on the perception and skill of the operator, and the desired accuracy is not always obtained.

Arguably, with a conventional scanner in which each original is individually scanned, strict accuracy is not required in orienting the original on the drum, and reliance on the operator's judgment may suffice.

However, in using a composing scanner for reducing or enlarging the original picture which is scanned and recorded at a specified position or in case of a layout scanner which performs various image processing operations such as masking, to shorten and simplify the image processing operation it is indispensable to accurately orient and affix each original to the scanner drum.

SUMMARY OF THE INVENTION

It is an object of this invention to provide a novel positioning device for accurately and easily orienting an original with respect to a scanner drum by visual inspection, so that the original is parallel to or at a specified angle with the axis of the scanner drum based on a designated layout.

The foregoing object is accomplished by providing a device for orienting an original, characterized in that a part of the device comprises a cylinder whose outer diameter is smaller than the inner diameter of the scanner drum, a supporting member provided with an end portion for coaxially supporting said cylinder inserted therein, and a direction indicating pattern holding member on the cylindrical surface of which a required pattern is formed. The scanning drum of a conventional scanning unit of a drum-type image scanning apparatus is generally composed of transparent material. The positioning device for orienting and attaching the original in this invention is constructed so as to be coaxial with the cylindrical scanner drum and the inner part of the device is formed into a double structure, and a principal member thereof is a direction indicating pattern holding member which the operator can observe from the outside. The pattern formed on the cylinder surface can be seen through the transparent drum wall. This pattern includes a reference line parallel with the drum axis or lines at various angles, so that it is possible to position a specified angle line of the pattern sheet corresponding to the angle for orienting the original on the inside of the drum onto which the original is to be correctly affixed. Thus the pattern formed around the pattern holding member can be seen through the transparent scanner drum wall and the original can be affixed to the original cylinder by orienting it with the pattern serving as a reference. Furthermore, any desired angular line can be so utilized, simply by selection of an appropriate pattern sheet for a designated layout.

Other objects, features and advantages of the present invention will become apparent in the course of the following description taken with the accompanying drawings.

BRIEF DESCRIPTION OF THE DRAWINGS

Like parts in the accompanying drawings are designated by the same reference numerals or characters throughout the specification.

DESCRIPTION OF THE PREFERRED EMBODIMENT

Figure 1:
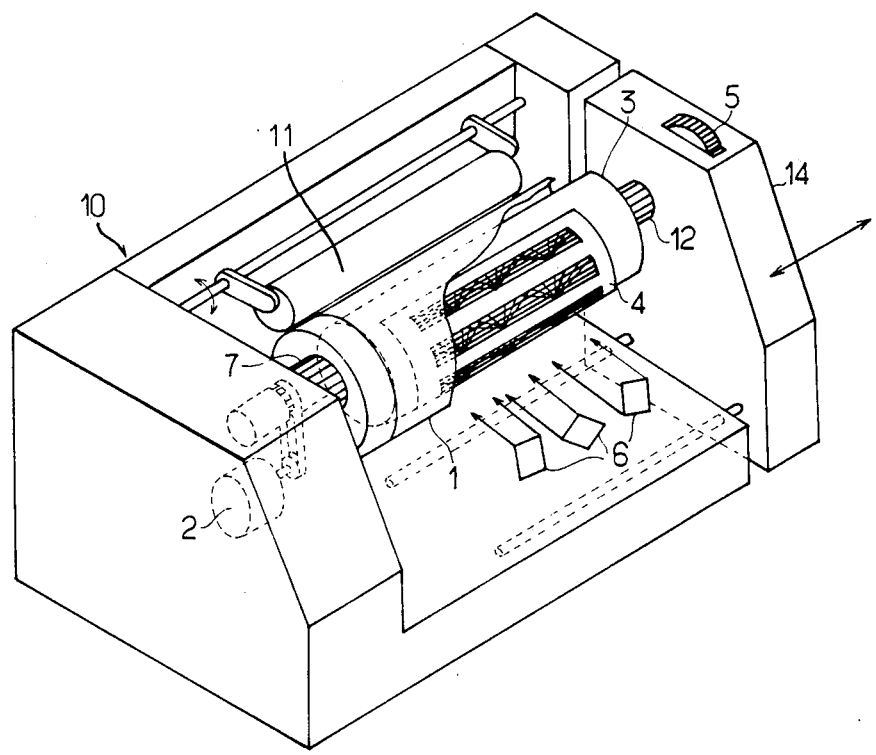
FIG. 1 is a partial perspective view of a conventional image of a scanner apparatus fitted with the apparatus of one embodiment of this invention.

Referring now to FIG. 1, showing a preferred embodiment of this invention, cylindrical scanner drum 1, typically made of a transparent plastic, is detachable from the inputting and scanning unit of a drum-type image scanning apparatus and is held in an "original" mounting apparatus 10. The positioning device according to this invention is also held by the original mounting apparatus 10. This apparatus 10 typically is provided separate from a scanner body to increase the operational efficiency of a color scanner, and is used for correctly affixing an original 6 to the drum 1. In the original-affixing process, for secure attachment of the original 6 to the original cylinder 1, to prevent the former from being partially separated from the latter or from sagging, one end of original 6 is fastened to the drum 1 with an adhesive tape. Then with continued pressing of the original 6 to drum 1 by means of a press roller 11 and slowly rotated drive motor 2, the unattached end of original 6 is manually pulled and fastened to drum 1 with adhesive tape by the operator. Drum 1 is then locked with a detachable locking ring 7 and is rotated by the drive motor 2.

Inside drum 1, a direction-indicating pattern holding member 3, which forms a principal part of this device for providing correct orientation to the original, is supported on the opposite side of the locking ring 7. This pattern holding member is preferably made of milk-white acrylic plastic tube, and is formed as a cylinder having its outer diameter smaller than the inner diameter of coaxially cylindrical drum 1. A supporting member 12 of an end of the original mounting apparatus 10 is further supported by a moving support part 14 thereof so as to interlock with a rotatable ring 5 and, as a result, any of desired patterns 13, 13', 13'', 13''', best seen in FIG. 2, can be selected by turning the ring 5. In addition, when detaching drum 1 from the original mounting apparatus 10, it is possible to move the moving part 14 transversely as indicated by the double-headed arrow in FIG. 2.

Figure 2:
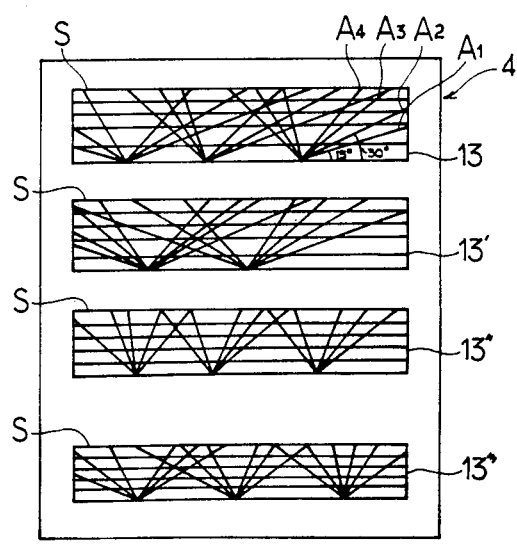
FIG. 2 is an example of a pattern sheet typical of those useable with this invention.

A pattern sheet 4 is wrappingly mounted around the direction-indicating pattern holding member 3. Various angle lines, $A_1$–$A_4$, are drawn on the pattern sheet 4, as illustrated in FIG. 2. Lines S are also drawn establishing parallels with the drum axis as a reference, and the pattern sheet 4 is placed so that the reference line S is parallel with the drum axis when mounted on the direction-indicating pattern holding member 3.

It is advantageous to provide an illuminating fluorescent lamp (not shown) inside the milk-white pattern holding member 3 which then transmits a pale light from the illumination due to the fluorescent lamp within it, thereby making each line drawn on the pattern sheet 4 clearly visible through transparent drum 3 to serve as a reference for orienting originals on the outside surface of drum 3.

In the process of affixing the original 6, the pattern sheet 4 mounted on the direction-indicating pattern holding member 3 can be seen through the drum 1. Accordingly, when orienting the original to be in parallel with the axis of the drum while rotating the direction indicating pattern holding member 3, it is possible to position the reference line S on the backside of the original. Also when orienting the original at a predetermined angle to the drum axis, it is possible to position a corresponding angle line like $A_1$–$A_4$ at the rear of the original. Therefore, while observing a reference line S or an angle line $A_1$–$A_4$ of the pattern sheet 4, mounted on the pattern holding member 3 and located at that position of drum 1 to which the original 6 is to be attached, and aligning relevant portions of the original to be coincident with selected lines seen through the transparent drum 1, the original is oriented as desired. One end of the original is affixed, e.g., by taping, at its correct position on the drum. Then the other end of the original is further affixed with adhesive tape while the original is being pressed by the press roller 7 and rolled onto the original cylinder by slow rotation of the drive motor 2.

The spacing between the inside of drum 1 and the direction-indicating pattern holding member 3 should preferably be kept as small as possible to reduce alignment errors due to optical parallax. Some clearance between these coaxially cylindrical members obviously must be maintained to allow changing of pattern sheets as needed. Also, it is preferable to provide several kinds of patterns on a plurality of sheets similar to the sheet 4 shown in FIG. 2, each having the necessary angle lines drawn up and down and to the left and right, so that the original may be oriented accurately at the desired angle solely by appropriate choice of pattern sheet based on the designated layout.

In addition, since the positioning device 3 is not used at the time of scanning and inputting the original, the cylindrical surface of the device 3 can be additionally equipped with such marking means as a register mark, a positioning pin or the like, so that any pattern sheet is precisely placed according to these marking means.

Furthermore, the configuration of the direction-indicating pattern holding member of the original positioning device according to this invention is not limited to be cylindrical as a whole, and other shapes, e.g., a semicylinder that is semicircular in cross-section, are also suitable for use as discussed above so long as the side on which the pattern is formed is of cylindrical shape. Concerning the material thereof, a light transmissive one is preferred in view of the advantages in operating the device with illumination from inside, but such light transmittancy is not always required. In the above-described embodiment, although the pattern is formed on the cylindrical surface by wrappingly mounting the pattern sheet 4 thereon, it is also possible to draw the pattern directly on the cylindrical surface.

While the drum is detachable from the scanning unit of the drum type image scanning apparatus in the preferred embodiment for fitting of the original mounting apparatus where an original is to be affixed onto the original cylinder, it is quite possible to affix the original with the drum attached to the scanning unit. In this case, it is necessary to remove the positioning device from the drum before scanning takes place.

It should be noted that the patterns that can be used are not limited only to lines, but patterns plotting cross-sections or register marks are equally useable. Furthermore, it is possible to mount on the pattern holding member itself a sketch about the direction or position of the original, with the outline of the original drawn by a graphic designer in place of the pattern sheet 4 discussed as an individual separate element.

While the above-described embodiments represent preferred forms of the present invention, it is to be understood that modifications thereof will readily occur to those skilled in the art without departing from the spirit of the present invention. The scope of the present invention, therefore, is to be determined solely by the appended claims.

What is claimed is:

1. Apparatus for precisely locating an image-bearing original for selectively oriented affixation to the exterior surface of a hollow, cylindrical, transparent walled drum, controllably rotatable about a predetermined axis of rotation of a drum-type image scanning system, comprising:
   a predetermined pattern on a thin transparent sheet of a size and shape not larger than the inside surface of said hollow cylindrical drum; and pattern supporting means for supporting said pattern within said hollow cylindrical drum, such that said pattern is supported adjacent said inside surface of said drum in a predetermined juxtaposition with said axis of rotation and rotatable with said drum for viewing of said pattern through said transparent wall of said drum.

2. Apparatus for precisely locating an image-bearing original according to claim 1, wherein:
said pattern comprises at least a first line alignable parallel to said axis of rotation and at least a second line aligned at a predetermined angle to said first line.

3. Apparatus for precisely locating an image-bearing original according to claim 1, further comprising:
illumination means for illuminating said pattern to facilitate said viewing.

4. Apparatus for precisely locating an image-bearing original, according to claim 1, wherein:
said pattern supporting means is a cylinder whose outer radius is smaller than the inside radius of said drum by an amount at least as large as the thickness of said pattern.

5. Apparatus for precisely locating an image-bearing original, according to claim 1, wherein:
said pattern supporting means is provided with a pattern-aligning reference for precise location of said pattern with respect to said axis.

6. Apparatus for precisely locating an image-bearing original, according to claim 5, wherein:
said pattern supporting means is provided with pattern holding means for holding said pattern in said precise location.

7. Apparatus for precisely locating an image-bearing original, according to claim 4, further comprising:
illumination means for providing illumination from within said pattern supporting means; and
wherein said pattern supporting means has light transmitting walls so that said illumination is transmitted through said walls and through said pattern so as to facilitate viewing of pattern details from the outside of said transparent walled drum.

8. A method for precisely locating an image-bearing original for selectively oriented affixation to the exterior surface of a hollow, cylindrical, transparent walled drum controllably rotatable about a predetermined axis of rotation of a drum-type image scanning system, comprising the steps of:
marking a predetermined pattern on a thin transparent sheet of a size and shape not larger than the inside surface of said hollow cylindrical drum, said pattern containing at least one straight line;
supporting said pattern within said drum in predetermined juxtaposition with said axis of rotation for viewing of at least said line through said transparent wall of said drum;
orienting said original in predetermined juxtaposition with said viewed pattern; and
affixing said oriented original securely to said drum.

9. A method for precisely locating an original according to claim 8, further comprising the step of:
illuminating said pattern for convenient observation of said pattern while orienting said original.

10. A method for precisely locating an original according to claim 8, wherein:
said predetermined juxtaposition of said pattern places said line therein parallel to said axis of rotation.

* * * * *